Figure 22:
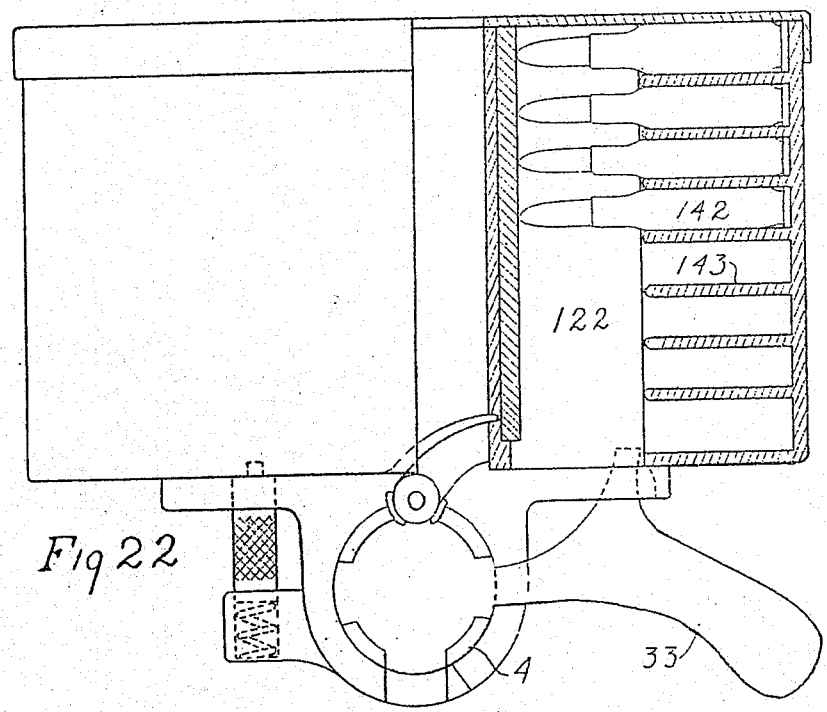

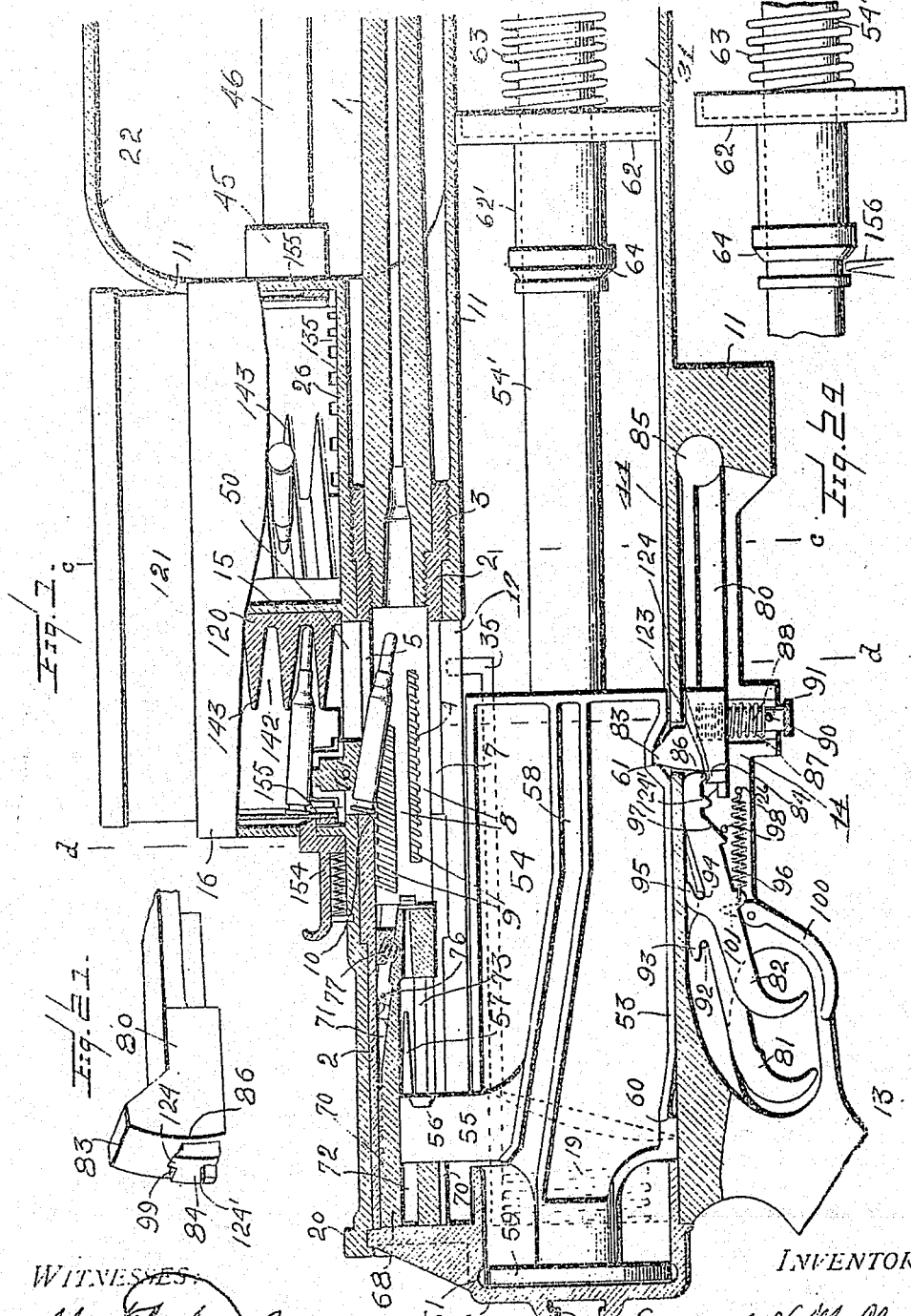

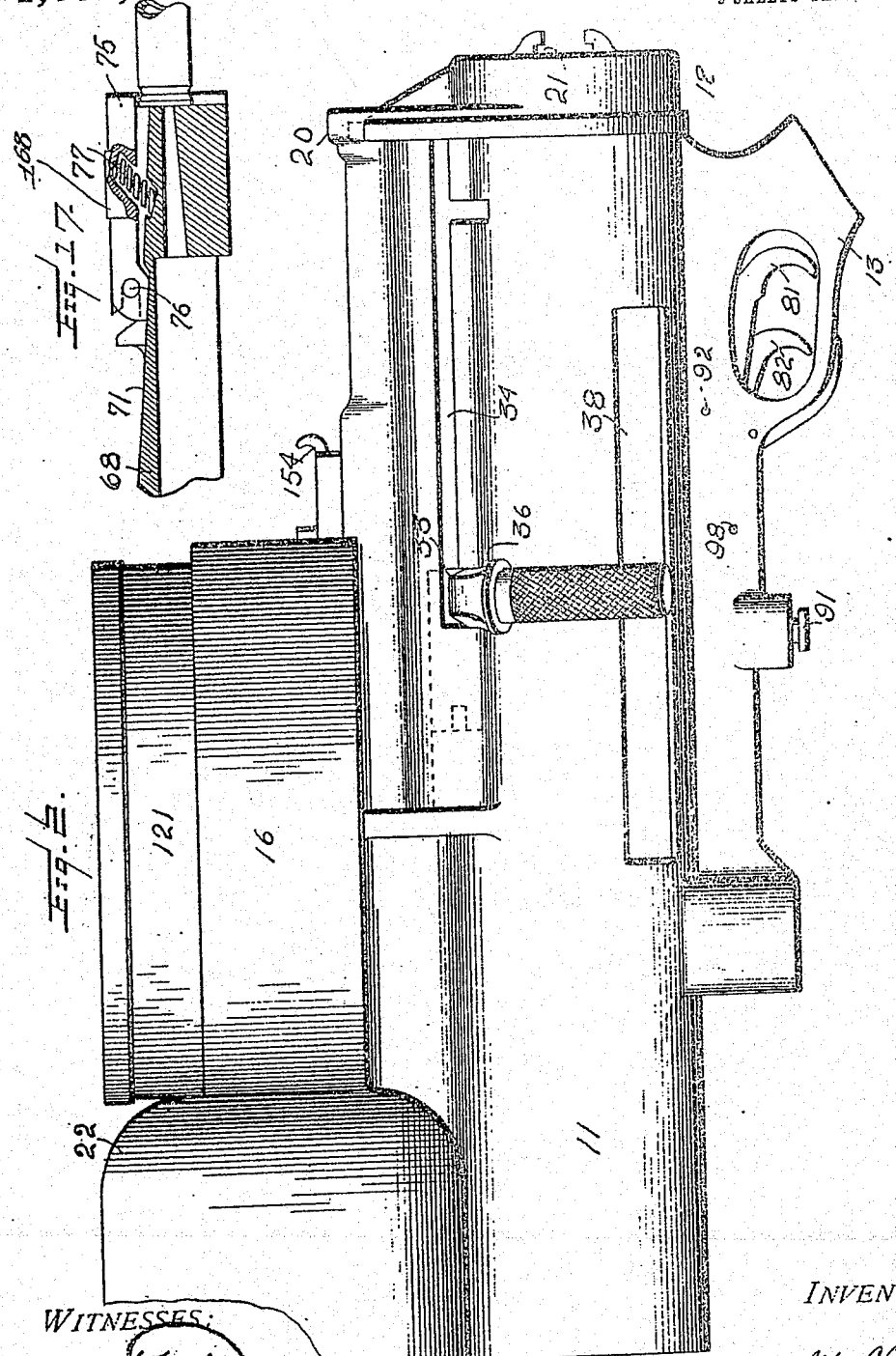

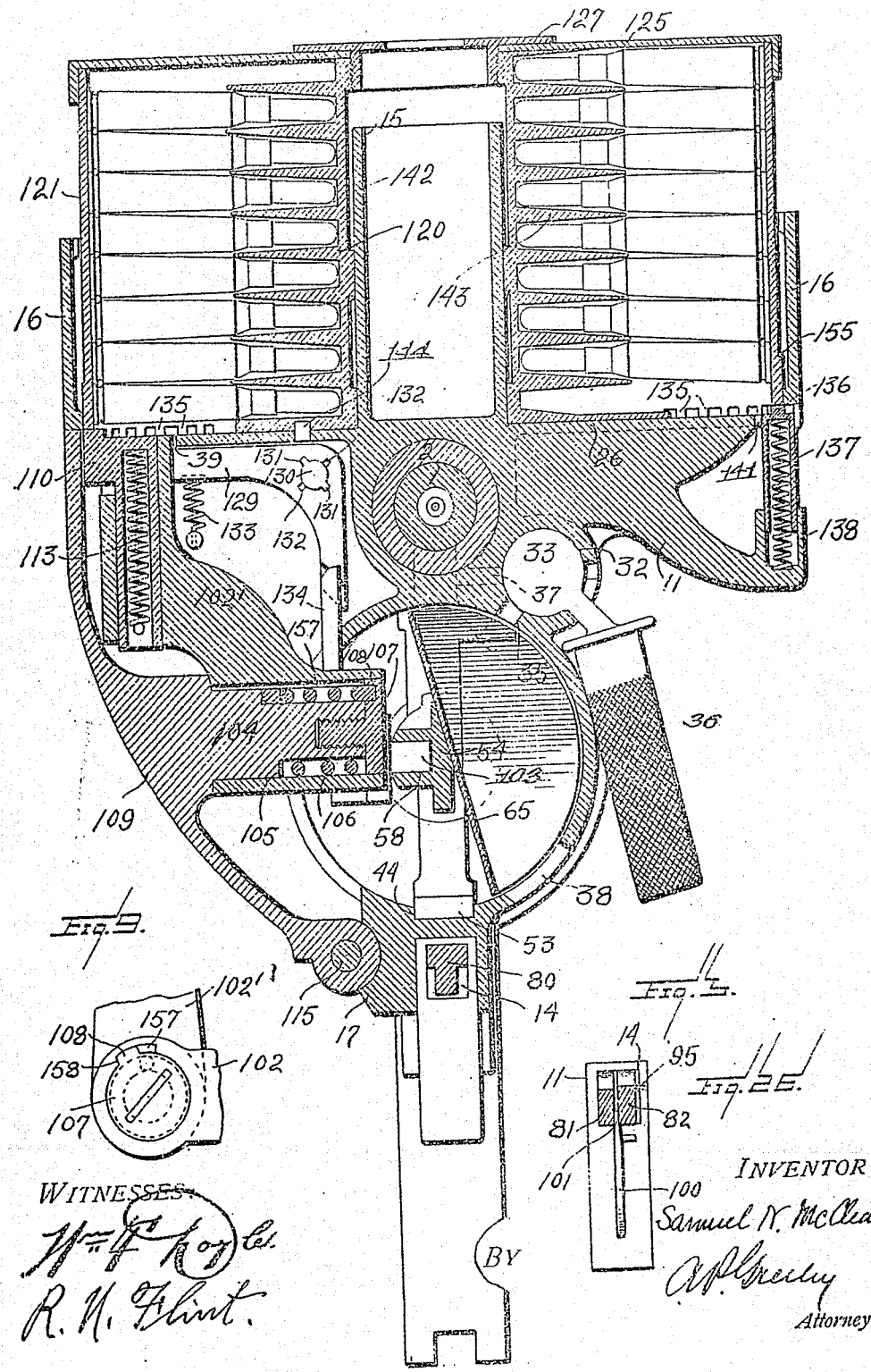

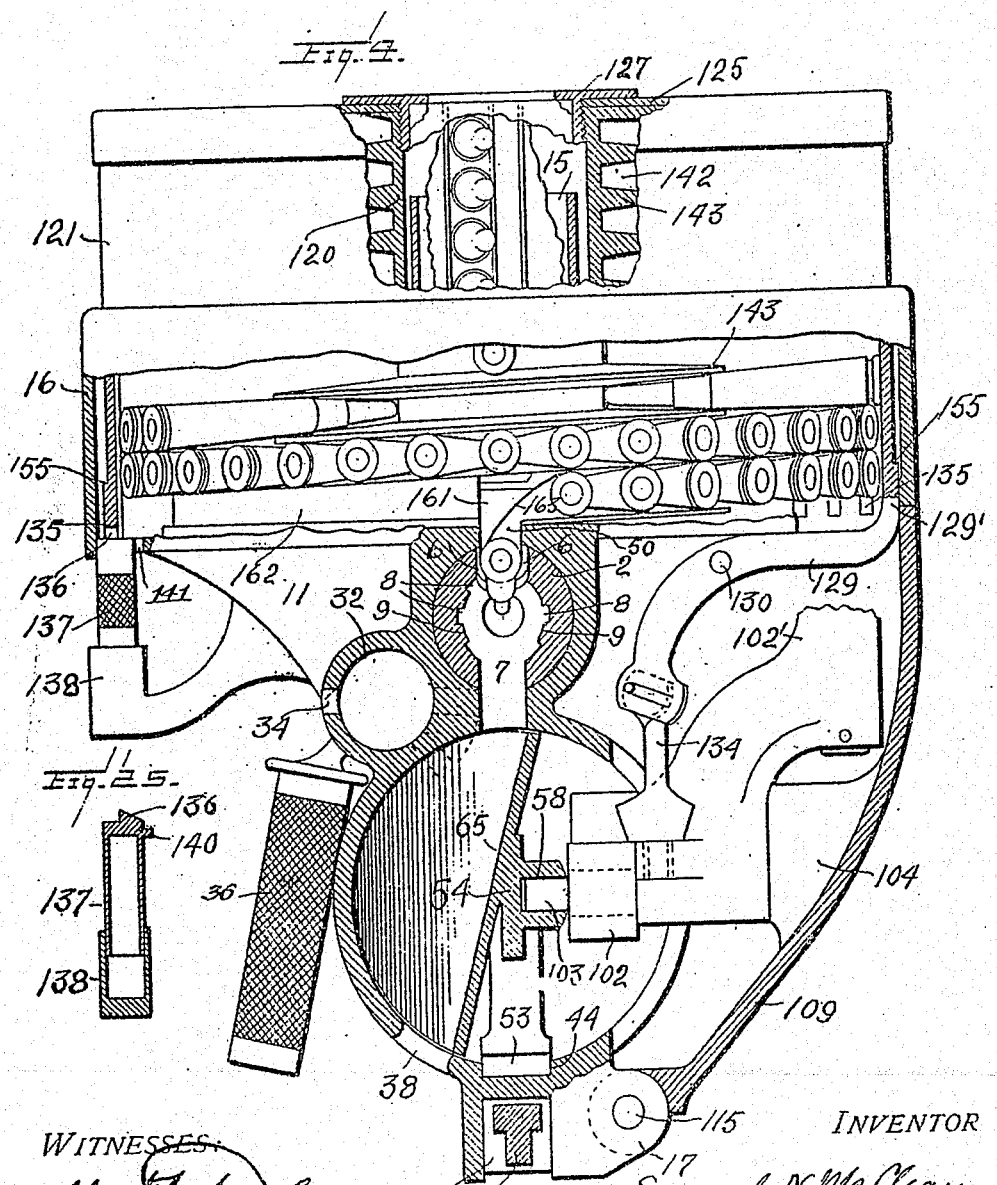

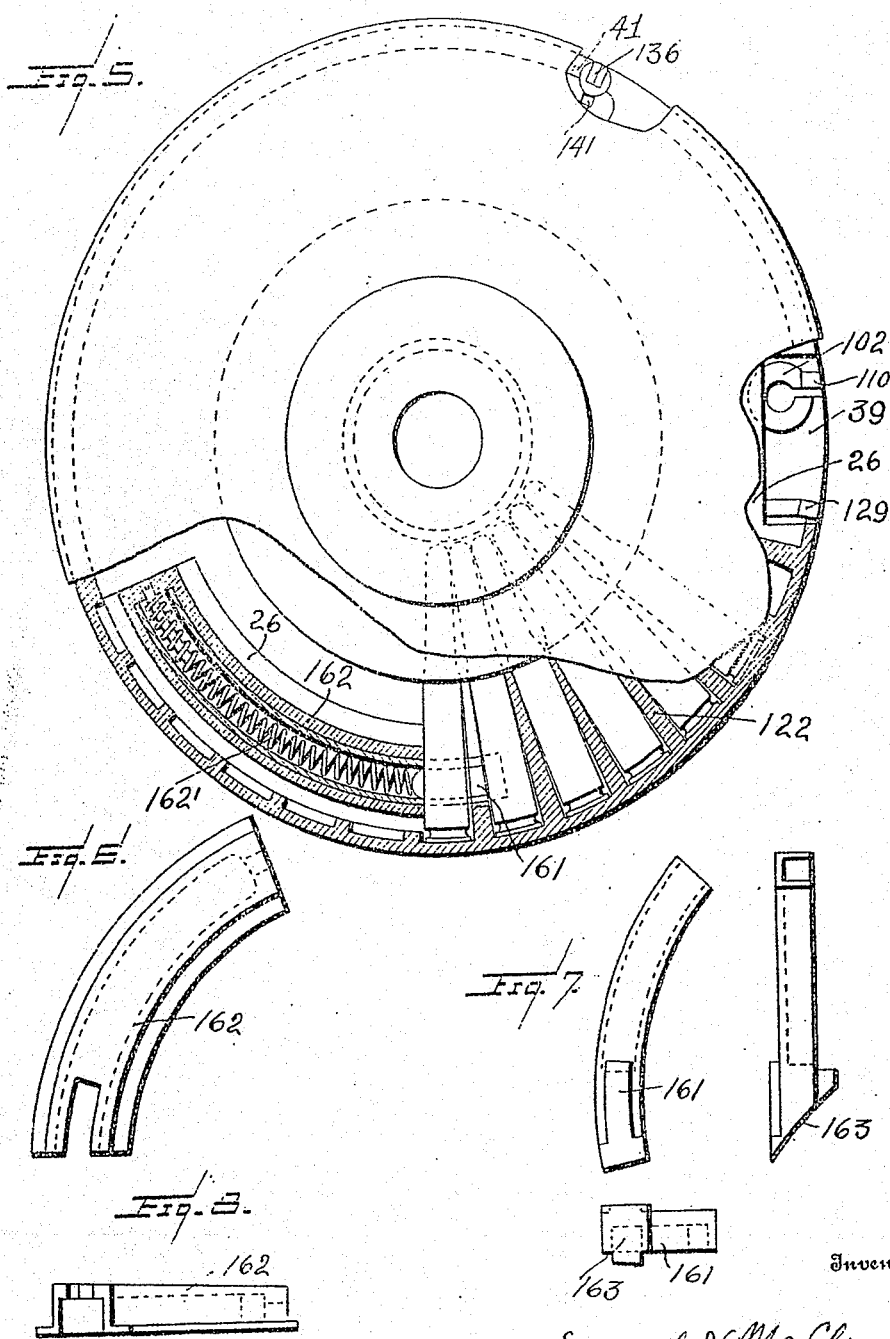

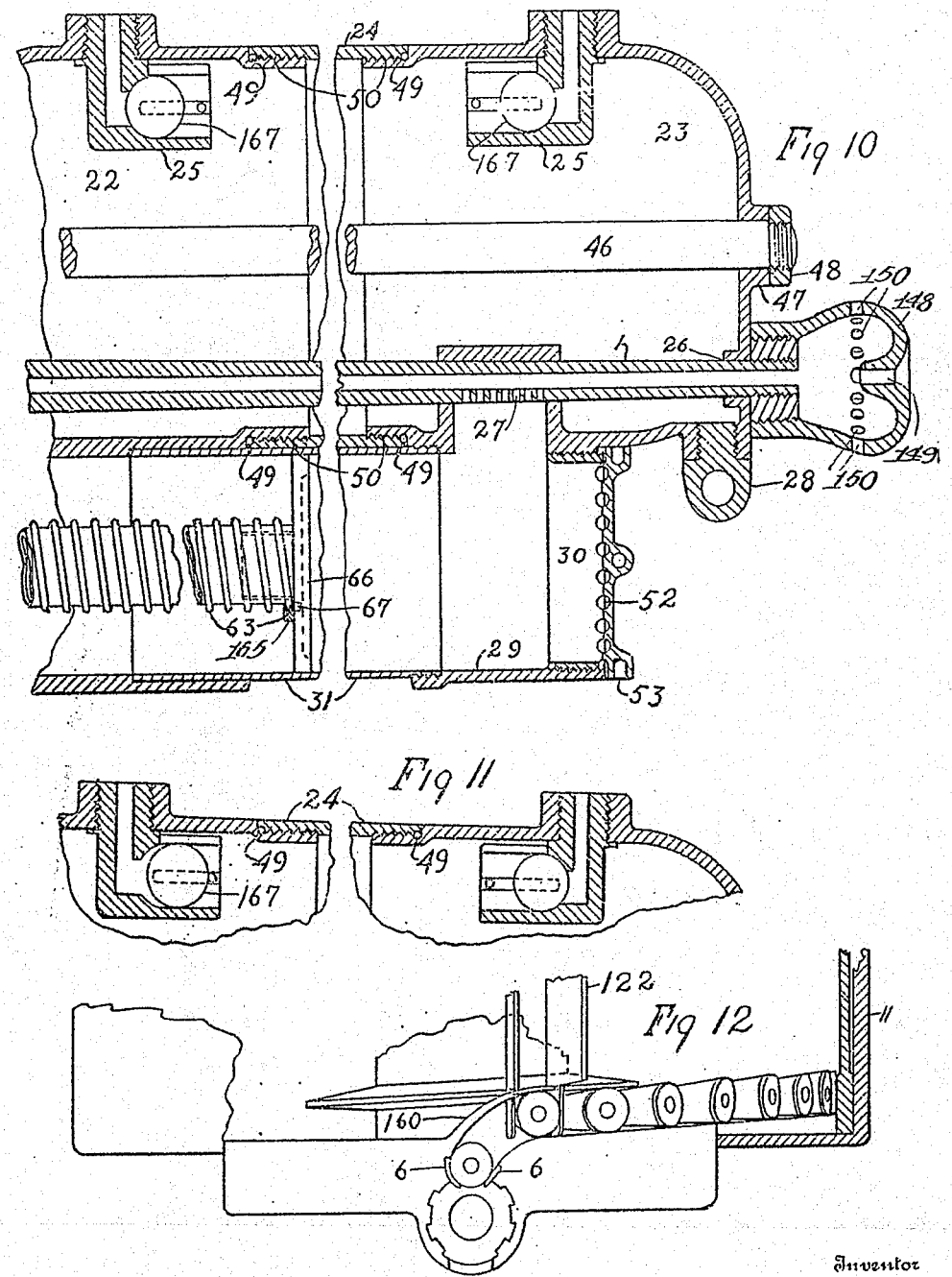

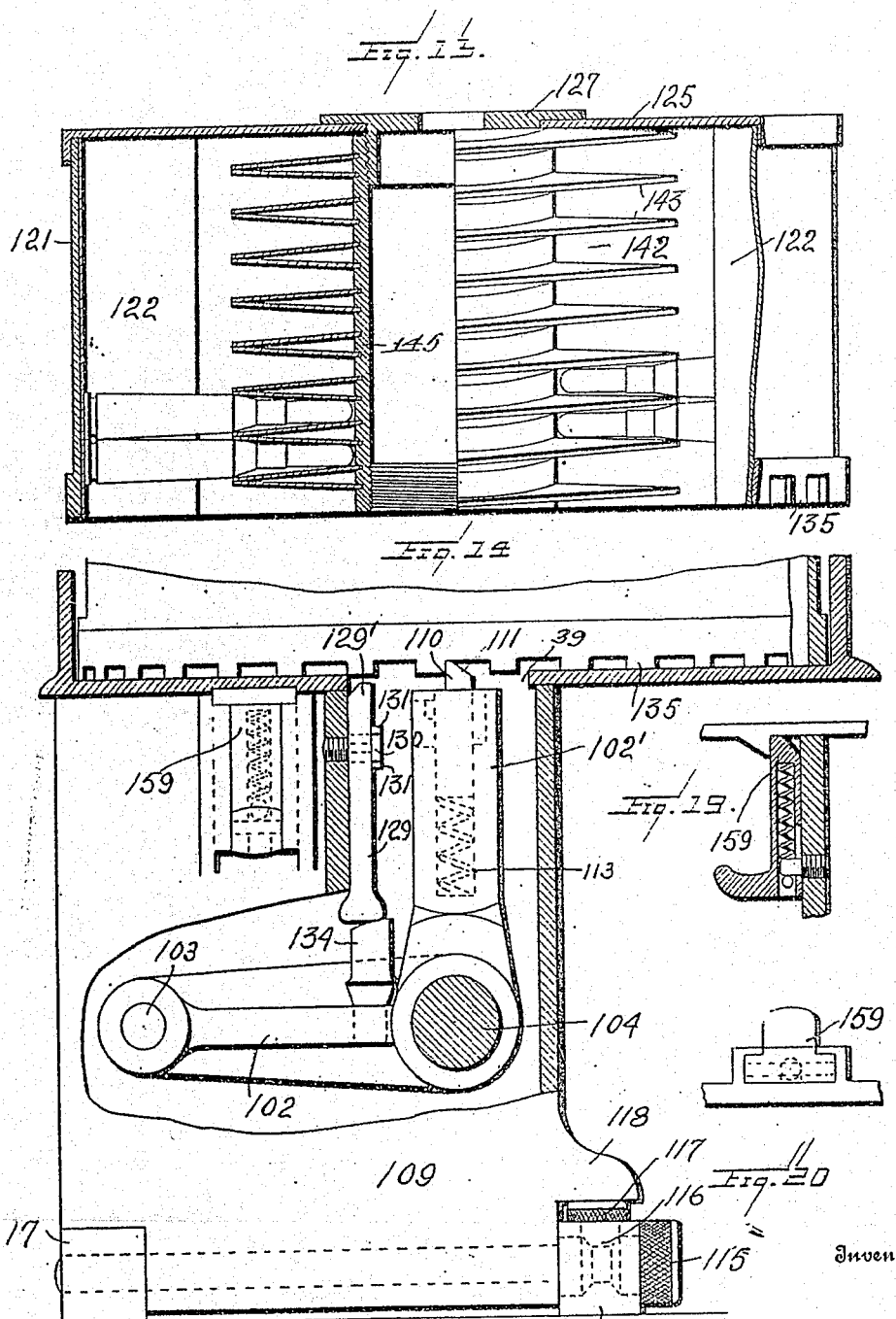

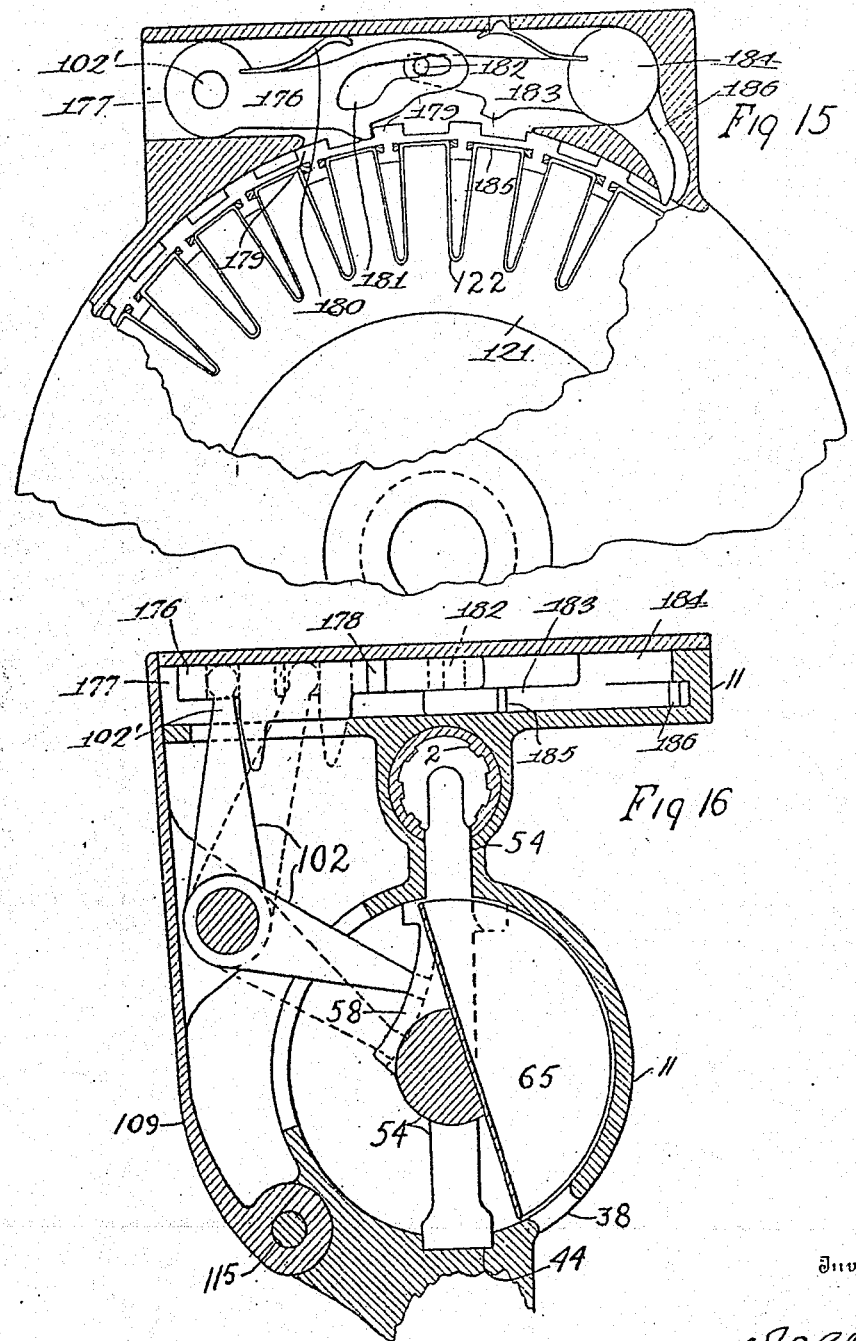

BEST AVAILABLE COPY

UNITED STATES PATENT OFFICE.

SAMUEL N. McCLEAN, OF CLEVELAND, OHIO, ASSIGNOR, BY MESNE ASSIGNMENTS, TO THE AUTOMATIC ARMS COMPANY.

BREECH-LOADING AND DISCHARGE-ACTUATED FIREARM.

1,042,363.   Specification of Letters Patent.   Patented Oct. 22, 1912.

Application filed July 30, 1906. Serial No. 328,320.

*To all whom it may concern:*

Be it known that I, SAMUEL N. McCLEAN, residing at Cleveland, in the county of Cuyahoga and State of Ohio, have made certain new and useful Improvements in Breech-Loading and Discharge-Actuated Firearms, of which the following is a specification.

My invention relates to breech-loading and discharge-actuated guns, and more particularly to machine guns.

The object of the invention is to improve and simplify the construction of these guns, and to obtain certain military, mechanical and manufacturing advantages in connection with the feeding, firing, ejecting, and operating mechanism of these guns.

The more specific object of the invention is to construct a gun in which the breech mechanism and the feeding, firing, and ejecting mechanism shall be operated and controlled by a single operating slide; also to provide devices for utilizing the powder gas; also to provide an interlocking form of mechanism which may be removed by hand, and without tools; also to provide the gun with a novel form of cartridge magazine and magazine feeding mechanism.

A further object of my invention is to construct a machine gun in which the construction and combination of the operating and cartridge feeding mechanism shall be such as to remedy the difficulties of clogging and breaking, existing in machine guns of the well-known type using a cartridge belt feed;
also to do away with the complicated mechanism used in operating the cartridge belt, and in passing the cartridges from the belt into the breech chamber of the gun, and in extracting and ejecting the shell; also to remedy the difficulties of the cartridge belt feed due to dust and rust and moisture or dryness, causing excessive tightness or looseness of the cartridges, with the resulting clogging of the feed, when a part of the feed mechanism is made either of a canvas or flexible metal belt; also to provide a cartridge feeding mechanism of simple construction which shall compactly retain a large amount of ammunition, and loosely individually and positively retain, control and feed each consecutive and succeeding cartridge.

For the foregoing purposes I have constructed a discharge-actuated machine gun having a breech bolt and operating part engaging with a helical drum feed for consecutively and positively retaining and controlling the feeding and firing of the cartridges.

In the accompanying drawings, I have shown the invention in the form of a gas-actuated machine gun, adapted to fire standard musket ammunition. These drawings are, however, for the purpose of illustration, and the invention is not limited to the precise construction shown in the drawings.

Figure 23:
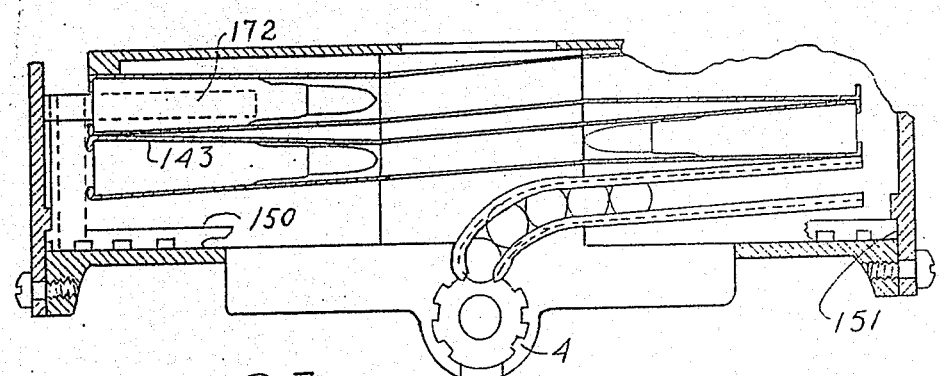

Figure 1 is a longitudinal central section of a musket machine gun and magazine feed, with the right-hand side of the gun removed, showing the piston rod and trigger mechanism in elevation, and the breech bolt in central section, and a broken sectional view of the magazine with the cartridges in elevation. Fig. 2 is a side elevation of the rear portion of the gun taken from the side opposite to that from which Fig. 1 is taken. Fig. 3 is a transverse section of the gun on the lines *c—c*, Fig. 1, looking to the rear. Fig. 4 is a broken sectional view of the gun on the lines *d—d*, of Fig. 1, looking to the front, certain of the parts of the magazine feed mechanism however being shown in elevation for the sake of clearness. Fig. 5 is a plan view of the cartridge magazine, partly broken away, and showing the cartridges in elevation, and the yielding abutment for the cartridges in transverse sectional view. Fig. 6 is a plan view of the housing for the yielding abutment. Fig. 7 shows a plan view, side elevation, and end view of the yielding abutment. Fig. 8 is an end elevation of the housing for the yielding abutment. Fig. 9 is a detail view of the end of the bearing of the bell crank lever. Fig. 10 is a broken, longitudinal, central section of the forward end of the gun, showing the gun barrel and water jacket, the gas muzzle for controlling the recoil, and the piston and cylinder for operating the slide. Fig. 11 is a broken sectional view of the water jacket and controlling valves. Fig. 12 is a broken sectional view of the cartridge magazine feed, showing the cartridges in elevation, and the abutment for the cartridges integrally formed with the gun frame. Fig. 13 is a broken sectional view of a modified form of the cartridge magazine, showing a sheet metal construction of the auger of the magazine, the view being partially in section. Fig. 14 is a broken sectional view of the cartridge magazine feed, showing the lower portion of the cartridge feed drum and the feeding and stopping pawls and the feed door by which these elements are supported. Fig. 15 is a broken sectional view of the cartridge magazine and gun frame, showing a modification of the magazine feeding and holding pawls; and showing also a sheet metal construction of the magazine drum. Fig. 16 is a transverse vertical sectional view showing the modified feed device of Fig. 15. Fig. 17, Sheet 2, is a longitudinal central section of the forward end of the breech bolt, showing the cartridge ejector. Fig. 18 is a bottom plan view of the breech bolt. Fig. 19 is a detail sectional view of the latch for the hinged door. Fig. 20 is an end view of the latch shown in Fig. 19. Fig. 21, Sheet 1, shows the rear end of the sear in elevation. Fig. 22 is a view of a modified form of the cartridge magazine and breech mechanism, partly in section and partially in elevation. Fig. 23 is a detail view of a modified form of the cartridge magazine and breech mechanism, showing the magazine and cartridges in elevation. Fig. 24, Sheet 1, is a detail view showing the abutment on the piston rod with the arm for holding it against rearward movement. Fig. 25 is a detail sectional view of the detent pawl. Fig. 26 is a detail sectional view of the triggers and the cam for shifting the single firing trigger.

In the drawings 1 is the gun barrel screw threaded at its rear end into the receiver 2 which is exteriorly screw-threaded at 3 to engage the gun frame 11, which is preferably a casting suitably formed to carry and support the operating parts of the gun. The receiver 2 is a cylindrical tube extending to the rear end of the gun frame, provided on its interior with interrupted screw-threads 4 formed on lands 9 for engaging companion interrupted screw-threads on the breech bolt, and provided also with a slot 5 in its upper forward portion to receive the cartridge and having retaining wings 6 (Fig. 4) at the rear portion of the slot 5 extending slightly into the interior of the receiver, adapted to engage the shell of the cartridge as it is fed from the magazine and hold it with its forward end in position to enter the breech of the gun barrel and its rear end in position to be engaged by the breech bolt as it moves forward. The spaces 8 between the lands 9 receive the companion or co-acting screw thread section of the breech bolt when unlocked and serve as guide-ways therefor in the translation of the bolt. In the upper portion of the receiver there is also a cam 10 in position to be struck by the ejector. The receiver has a longitudinal slot 7 in its under side to receive and guide the arm of the operating slide.

The gun frame 11 has in its upper portion a longitudinal cylindrical chamber in which the receiver 2 is supported and in its lower portion a longitudinal cylindrical chamber in which reciprocates the operating slide by which the breech mechanism and cartridge feeding mechanisms are actuated. The upper and lower chambers are connected by a slot 12. Above the breech of the gun barrel 1 the gun frame has a flat portion or table 26 provided with an opening 50 in line with the slot 5 of the receiver and having at its center a spindle 15, preferably hollow, on which the rotary part of the cartridge magazine rotates. Concentric with the spindle 15 the flat portion or table 26 is preferably provided with an inclosing cylinder 16 to protect the drum of the cartridge magazine.

Forward of the cylinder 16 the gun frame 11 has a hollow head 22 adapted to receive the rear end of a cylinder 24 which incloses the gun barrel 1 and with the head 23 near the muzzle of the gun barrel forms a water jacket for cooling the gun barrel. Beneath the water jacket in line with the lower cylindrical chamber the gun frame is provided with a gas cylinder 31 in which reciprocates the piston by which the operating slide is actuated. The forward end of the gas cylinder 31 is secured in a hollow head 29 beneath and preferably integral with the forward head 23 of the water jacket.

On its under side the gun frame is provided with a pistol grip 13 and trigger guard and is suitably apertured at 14 to receive the sear and triggers. At its rear end concentric with the lower cylindrical chamber the gun frame is provided with screw-threads 19 preferably interrupted, to receive the screw-threads of a cap 18 by which the rear ends of the cylindrical chambers are closed.

On one side the wall of the lower cylindrical chamber is cut away preferably from a point forward of the line of the spindle 15 to a point slightly in rear of the line of the rear side of the cylinder 16 to form an opening through which access may be had to the interior of the lower cylindrical chamber. The gun frame is provided with a door 109 hinged to the hinge lugs 17 by which this opening is closed when the gun is to be used. The gun frame is provided on the side opposite to that on which the hinged door 109 is located, with a tubular guideway 32 parallel with the upper and lower chambers and communicating with the lower chamber by a slot 35, in which guideway a cocking slide 33 is adapted to be reciprocated. This slide 33 has secured to it a handle 36 extending outward through a slot 34 in the side of the guide-way 32 and also has a lug 37 extending inward through the slot 35 into the lower chamber to engage the operating slide. Also on the opposite side to that on which the hinged door 109 is located and in its lower portion the gun frame is cut away to form an opening 38 into the lower chamber for the discharge of the shells.

The operating slide 54, with its piston 66 (Fig. 10), tubular piston rod 54', and spring 63 constitutes a single operating part through the reciprocation of which the cartridge is fed into position, pushed into the breech of the gun barrel, the breech closed by the breech bolt, the cartridge fired and the shell withdrawn and ejected. The piston 66 is at the forward end of the piston rod 54' which extends forward from the slide 54. This piston fits and is adapted to reciprocate in the gas cylinder 31, and is reciprocated in one direction by the spring 63 and in the other direction by the gases of discharge. The spring 63 bears its forward end against the rear face of the piston and its rear end bears against an abutment 62 through which the piston rod slides freely, the abutment being held against movement when the gun is to be used, as hereinafter described.

The hollow head 29 in which the forward end of the gas cylinder 31 is secured is in communication with the bore of the gun barrel 1 through openings 27 through which a portion of the gases of discharge enters the hollow head and acts upon the piston 66 to drive it rearward against the force of the spring 63. The forward end of the hollow head 29 is closed in any convenient manner, preferably by a hollow screw plug 30 provided on its flange with openings 52 so arranged that by unscrewing the plug these openings will be more or less exposed to permit the escape through them of the excess of gas taken into the gas cylinder.

It will be apparent that while the projectile is passing through the portion of the barrel between the openings 27 and the muzzle it will momentarily act as a valve to check the escape of the gases and divert a portion of them through the openings 27 into the gas cylinder to drive the piston 66 rearward.

The operating slide 54 is provided on its lower edge with a guide rib 53 preferably of considerable relative width as shown which fits and reciprocates in a longitudinal guide groove 44 formed in the bottom of the lower chamber. This guide rib 53 is cut away on its under side near its rear end to form a vertical shoulder 60 and an incline leading rearward to this shoulder, and is cut away near its forward end to form a vertical shoulder 61 having an incline leading forward to the lower edge of this shoulder, both of these shoulders being adapted to be engaged by the sear as hereinafter described. On its upper side near its rear end the operating slide has an upwardly projecting arm 55 which extends through and is guided in a guide slot 12 connecting the upper and lower chambers, and also extends into the receiver 2 through the slot 7. This arm 55 carries at its upper end the firing pin 57 and has cam faces 56.

On its rear end the operating slide is provided with a circular plate or disk 59 adapted to fit the interior of the cap 18 to form with it a dash pot to absorb the shock of the rearward movement of the slide the cap being provided with an annular groove 51 to form a clearance for the disk 59. On its face which is toward the door 109 the slide 54 has formed therein a cam groove 58 which has its middle portion inclined upward toward the rear terminating at its forward end in a horizontal portion. This cam groove is adapted to receive a pin 103 on the rear end of the horizontal arm of a bell crank lever which is pivotally mounted on the hinged door 109 and is adapted as hereinafter described to rotate the cartridge magazine. The face of the slide opposite the side on which the cam groove 58 is formed is inclined outward toward the lower edge forming a deflector 65 the lower edge of which is in line with the discharge opening 38.

The abutment 62 is preferably cup shaped as shown on its forward face and is circular in cross-section and adapted to fit the interior of the gas cylinder 31. On its rear face the abutment is provided with an extension 62' having at its rear end a cam shoulder 64 adapted to be engaged by an arm 156, carried by the door 109, when the door is in closed position.

The breech bolt 68 is arranged to have both reciprocating and rotary movement. The forward end of the breech bolt is solid except for a central tapered opening to receive the firing pin 57. In rear of this solid end the breech bolt is bored out as shown at 72 and this bored out portion is slotted in its lower side to form a cam slot 73 having the sides 169 and 170 of its forward portion parallel with each other and in line with the axis of the breech bolt. The rear portion of the cam slot has a portion 171 parallel with the axis of the breech bolt but in a different plane from portion 169 the portions 169 and 171 being connected by a cam incline 74. The straight portion 170 extends farther to the rear than does the straight portion 169 and terminates in a cam 172 inclined rearward and toward the portion 171 terminating about in line with the straight portion 169. The upper end of the arm 55 is reduced in thickness so as to enter the cam slot 73.

The breech bolt is provided on its exterior with longitudinal ribs 70 provided in their forward portions with locking lugs forming interrupted screw-threads adapted to engage the interrupted screw-threads 4 formed on the longitudinal ribs or lands 9 of the receiver, the ribs 70 being adapted to slide freely in the longitudinal spaces 8 of the receiver when disengaged from the interrupted screw-threads. At its forward end the breech bolt is provided, on opposite sides, in line with two of the ribs 70, with pivoted extractors 78 (Fig. 18) having their forward ends provided with hooks adapted to engage the rim of the cartridge shell, and normally spring-pressed inward, and is also provided at its forward end on its upper side with an ejector 75 (Fig. 17) pivoted at 76 and normally spring-pressed outward away from engagement with the rim of the cartridge by spring 77 and having a cam 168 on its upper edge adapted to be engaged by cam 10 in the receiver as the breech block moves rearward to effect the ejection of the cartridge. In order to permit the breech bolt to rotate the ribs between the guideways 8 are cut away at their forward ends for a distance corresponding with the length of the extractor and ejector, and the breech bolt is cut away at 71, so that the breech bolt may rotate without striking the wings 6. As the operating slide begins to move rearward from its forward position, the upper end of the arm 55 will travel rearward between the parallel portions 169 and 170 of the cam groove 73 without moving the breech bolt but as the rear edge of the upper end of the arm comes in contact with the cam 172 it will cause the breech bolt to rotate to disengage the locking lug on its ribs 70 from the screw-threads of the receiver and as the upper end of the arm continues its rearward movement it comes against the rear end of the slot 73 and carries the breech block bodily to the rear. On the return movement the upper end of the arm 55 carries the breech bolt bodily forward, the breech bolt being prevented from rotating by the engagement of its ribs 70 with the lands or ribs 9, until the forward end of the breech bolt is in position to be locked. The further forward movement of the slide brings the upper end of the arm 55 against the cam incline 74 causing the breech bolt to rotate to bring its locking lugs or screw threads into engagement with the interrupted screw-threads of the receiver. In this position the slide will be engaged by the sear, as hereinafter described, when the gun is to be used for firing single shots. On releasing the slide by pressing the single shot trigger to depress the sear, the slide will complete its forward movement to drive the firing pin 57 against the cartridge, the upper end of the arm 55 moving in a straight line between the parallel portions 169 and 170 of the cam slot.

The bell crank lever is pivoted on a short shaft 104 carried by the door 109 and extending inward in a horizontal plane when the door is in closed position. Its horizontal arm 102 (see Figs. 3 and 14) carries a pin 103 which, when the door is closed engages the cam groove 58 of the operating slide 54. Its vertical arm 102' is provided with a yielding pawl 110 which extends upward through a slot 39 in the flat portion or table 26 of the gun frame into position to engage teeth 135 formed on the lower edge of the drum of the cartridge magazine and has incline 111. The teeth 135 preferably have square faces on both sides. Pivoted in the upper part of the door 109 on a pivot 130 at right angles to the axis of the short shaft 104 is a lever 129 having a stopping pawl 129' at its upper end adapted, when in raised position, to extend through the slot 39 into engagement with the forward face of a tooth 135. This pawl is arranged to be upwardly spring-pressed by a spring 133 but is normally held in depressed position by the engagement with its tail piece of a cam 134 carried by the horizontal arm 102 of the bell crank lever. As the operating slide 54 moves rearward the cam groove 58 through its engagement with the pin 103 depresses the horizontal arm 102 of the bell crank lever and swings the vertical arm forward causing the pawl 110 by its engagement with a tooth 135 to move the drum of the cartridge magazine forward. As the bell crank lever completes its movement the cam 134 permits the tail piece of the lever 129 to be depressed and the other end of this lever to be raised by the spring 133 to swing its pawl 129' into the path of the tooth acted on by the pawl 110 to stop its further movement. The drum of the cartridge magazine is thus, through the action of the operating slide, fed forward positively at each forward movement of the slide a definite distance and any movement in excess of the desired movement is positively prevented. In order to lock the drum against backward movement the flat portion or table of the gun frame is provided at a convenient point with a spring-pressed detent pawl 136 adapted to yield to permit a tooth 135 to pass over it and to engage the rear face of the tooth to prevent any backward movement.

The cartridge magazine comprises essentially a rotary part provided with teeth 135 to be engaged by the pawls 110, 129' and 136 and adapted to carry the cartridges with it in its rotation, and a relatively fixed helical or auger guide by which as the cartridges are rotated they are caused to be advanced toward the slot through which they are fed to the breech of the gun. In the present construction (see Figs. 3, 4, and 5) the rotary part consists of a drum 121 having the teeth 135 at its lower edge and having on its interior vertical inwardly extending radial wings 122 spaced apart a sufficient distance to receive between them the butt end of a cartridge. The helical or auger guide 120, in the present construction, is located within the drum 121 and is in the form of a flat strip or shelf 143 extending from end to end in the form of a helix about a central cylinder which fits upon the spindle 15, the space 142 between successive shelves or convolutions of the helix being adapted to receive the bullet end of a cartridge. The lowermost shelf or convolution of the helix is so formed as to present a horizontal face to the flat portion or table of the gun frame on which it rests and when in use its end is in register with the edge of the slot 5 of the receiver to afford free passage of the lowermost cartridge. A pin 144 (see Fig. 3) carried by the table 26 engages a recess in the auger 120 to lock it against rotation.

The helical or auger guide 120 and the drum 121 are secured together in any convenient manner which will permit of their relative rotation. In the construction shown the head 125 of the drum fits on a shoulder on the outer end of the hub of the auger 120 on which it turns freely and is held there by an outer plate 127 secured to the cylinder.

The cartridge magazine is locked in position by any convenient means as by spring catches 154 carried by the inclosing cylinder 16 engaging a peripheral shoulder 155 on the drum 121, the drum being guided in its rotation by the cylinder and by engagement of the hub of the auger 120 with the spindle 15 when in position for use. The cartridge magazine may thus be readily placed in position or removed when empty and a fresh magazine substituted.

The cartridge magazine may be readily loaded by placing it in inverted position and inserting cartridges one by one with the bullet end in the space 142 and the butt end in the space between two wings 122 rotating the helical guide or auger as the cartridges are placed in position, to carry them toward the head of the drum. The cartridge magazine being simple in construction and not easily gotten out of order may be made of inexpensive material and may be loaded at the place where the cartridges are made and will serve as a package for transporting the cartridges.

For the purpose of securing the proper feeding of the cartridges to the slot 5 of the receiver a yielding abutment 161 (Figs. 4-8) is provided mounted on the flat portion or table 26 of the gun frame having its end provided with a cam face 163 and extending over the opening 50 from the side opposite to that from which the cartridges are brought to the opening. This yielding abutment is formed on the arc of a circle concentric with the spindle 15 and its shank is carried in a housing 162 secured to the flat portion of the gun frame. A spring 162' within the housing serves to yieldingly hold the head of the abutment over the slot 5. As the magazine is rotated it will bring a cartridge in line with the slot 5 and against the inclined head 163 of the abutment 161 pressing the abutment backward against the force of its spring 162', the resistance of the spring serving to check any momentum which the magazine may have and insuring its coming to rest without shock. As the magazine completes its movement it forces the cartridge against the cam face 163 which causes it to be positively fed through the opening 50 into the slot 5 of the receiver where it rests on the retaining wings 6 ready to be pushed forward by the breech bolt.

The resistance of the yielding abutment will begin to act to check the movement of the magazine before the pawl 110 completes its feeding movement and before the stop pawl 129' is raised into position to positively stop further rotation.

The sear 80 has at its forward end a journal 85 adapted to be received in and to swing in a bearing formed in the portion of the gun frame directly below the lower chamber and its free end is upwardly spring-pressed by a spring 87 the tooth 83 of the sear extending upward through an aperture in the bottom of the guide groove 44 into position to engage the shoulders 60 and 61 of the sear notches in the under side of the guide rib 53 of the operating slide. The rear end of the sear is formed on the arc of a circle as shown at 86 the center of which is the axis on which it swings and is guided by suitable arc-shaped bearings in the gun frame. Between these bearings the sear is provided with a rearward extension 84 with which the forward ends of the triggers 81 and 82 engage.

The trigger 81 controls the automatic action, being arranged to be capable of holding the free end of the sear depressed so that its tooth 83 will not engage either of the shoulders 60 or 61 and the trigger 82 is arranged to be capable of only momentarily depressing the free end of the sear to free its tooth 83 from the shoulder 60 or 61 with which it may be engaged. The two triggers are arranged side by side and their forward ends normally rest upon the rearward extension 84 of the sear. The forward end of the trigger 81 rests on a flat shelf 99 formed on one-half of the extension 84, and the trigger is pivoted on a pin 92. By pressing the finger piece of this trigger, the trigger acts as a lever to press the free end of the sear down and hold it down so long as the pressure on the trigger piece continues. The trigger 82 is formed with a hook 123 at its forward end to engage a shoulder 124 on the half of the extension 84 opposite that on which the shelf 99 is formed. This trigger 82 is pivoted on a pin 94 on which it is also permitted to have longitudinal movement. A spring 96 connected at one end to the trigger and at the other end to a pin 126 holds the trigger normally in its forward position with its hooked end engaging the shoulder 124 of the extension 84. On the under side of this trigger forward of its pivot is formed a cam 97 which, as the trigger is pressed, comes in contact with a pin 98 and as the pressure is continued the trigger is forced rearward against the force of the spring 96 causing its hooked end to slip rearward off the shoulder 124 on the extension 84 and rest on the lower shoulder 124' of the extension, the tooth 83 of the sear being thus allowed to be pressed upward by its spring 87 to bring it into position to engage the shoulder 60 but not sufficient to permit it to engage the shoulder 61 so long as the end of the trigger presses on the shoulder 124'. The operating slide will thus be permitted to be forced rearward by the gases of discharge and to move forward to force a cartridge into the breech and close the breech, the forward part of the operating slide passing over the tooth 83 without engagement, the operating slide, however, being stopped in firing position by the engagement of tooth 83 with shoulder 60. By this arrangement the trigger 82 may be used for semi-automatic firing.

When it is desired to dispense with the cartridge magazine and insert cartridges one by one by hand, the forward end of trigger 82 is pushed over to one side by means of a cam 101 carried by a lever 100 pivoted on the finger guard, so that it will be out of the path of the lower shoulder 124'. When so arranged after the trigger has been pressed to fire a shot, its end will slip off the shoulder 124 and the free end of the sear will rise bringing its tooth 83 into position to engage the shoulder 61 as the operating slide begins to move forward after it has been forced to its rearward position by the gases of discharge thus holding the breech open for a cartridge to be inserted by hand through the slot 5. On releasing the pressure on the trigger, its forward end resumes its position above the shoulder 124 and on again pressing the trigger the sear is pulled down to release the operating slide.

The gun barrel 1 is preferably provided at the muzzle with an attachment for checking recoil consisting of a hollow extension 148 screw-threaded onto the muzzle having an opening 149 in line with the bore of the gun and a series of openings 150 in its periphery for the escape of the gases of discharge.

The cap 18 by which the rear end of the gun frame is closed is connected to the gun frame by screw-threads 19 and is provided with an extension adapted to close the rear end of the receiver 2. The extension is adapted to engage a lug 20 on the gun frame at the rear end of the receiver when the cap 18 is screwed into position to close the end of the gun frame. On its rear face the cap is provided with lugs 21 forming between them a slot adapted to receive a bar by which the cap may be screwed into closed position or unscrewed.

The hollow heads 22 and 23 of the water jacket are preferably each provided on their upper sides with an opening 25 controlled by a ball valve 167, the ball valves being so arranged that they will permit the entrance of water and will permit the escape of steam but will not let water escape at whatever angle the gun may be elevated or depressed. The head 23 preferably has in its under side an opening closed by a screw plug 28 to permit the water to be let out from the water jacket. The heads 22 and 23 are held together by rod 46 screwing into socket 45 in head 22 and having nut 48 at its outer end.

The operating parts of the gun are so constructed as to be readily assembled and disassembled without the use of wrenches or other tools.

In order to disassemble the gun cap 18 is first unscrewed. On the removal of this cap and the opening of the door 109 the arm 156 is withdrawn from engagement with the shoulder 64 carried by the abutment 62 and the operating slide 54 with the abutment 62, the piston rod 54', piston 66 and spring 63 may be withdrawn through the rear end of the gun frame bringing with it the breech bolt which may then be lifted off the upper end of the arm 55.

The door 109 is hinged to the gun frame by means of a removable pintle 115 provided with a groove 116 which when the pintle is in position is in line with a hole formed in hinge lug 17 to receive the pin 117, the end of which enters the groove 116. When the door is closed this pin 117 is covered up by shoulder 118 of the door and cannot fall out. When the door is opened the pin may be readily removed and the pintle 115 may then be withdrawn and the door removed.

The short shaft 104 on which the bell crank lever is pivoted is preferably formed integral with the door 109 and projects inward therefrom. Near its inner end it is turned down to form a shoulder 105 on which is carried a torsion spring 106 one end of which engages a hole in the shoulder and the other end engages a hole in a locking disk 107 carried on a pin which is preferably screw-threaded into the end of the short shaft 104. This disk 107 has on one side a lug 108. The bearing formed in the bell crank lever to fit the short shaft 104 has a key-way 157 on one side adapted to receive the lug 108 and at the inner end of this key-way an offset 158 is formed adapted to receive the lug 108 into which it is turned by the spring 106, thus locking the bell crank lever against removal, the spring also acting through the locking disk 107 and its lug 108 to swing the vertical arm 102' toward the muzzle of the gun. The disk 107 is preferably provided in its face with a slot to receive a screw driver by which it may be turned against the force of the spring 106 sufficiently to bring the lug 108 into line with the key-way 157 when the bell crank lever may be slipped off the shaft 104.

The yielding pawl 110 is mounted to slide vertically in the vertical arm 102' of the bell crank lever and is pressed upwardly by a spring 113 carried in a chamber formed in the pawl.

The pivot 130 on which lever 129 swings is provided at its free end with radial lugs 131 and the bearing in the lever which fits over the pivot 130 is provided with key-ways 132 adapted to receive the lugs 131 but so located that they will not be in register with the lugs when the lever is in operative position. After the bell crank lever has been removed the lever 129 may be readily swung to bring the key-ways 132 into register with the lugs 131 when the lever may be slipped off its pivot.

In assembling the parts carried by the door 109 the lever 129 and its spring are first placed in position and the locking disk 107 is then turned by a screw driver against the force of the spring 106 to bring its lug 108 in line with the key-way 157 when the bell crank lever may be pushed onto the shaft 104. As it reaches its operative position the lug 108 passes into the offset 158 locking the bell crank lever against removal. In assembling these parts care should be taken to see that the tail piece of the lever 129 is above the horizontal arm 102 of the bell crank lever before the bell crank lever is pushed fully back to operative position.

The door 109 is locked in closed position by a spring latch 159 of any convenient construction, engaging a notch formed in the under side of the flat portion of the gun frame.

The operating slide 54 and its connected parts, after being withdrawn through the open end of the gun frame, may be readily disassembled. For this purpose the piston 66 (Fig. 10) is constructed with a screw-threaded hub adapted to screw into the end of the piston rod 54' and the piston is provided on its inner face with a hole 67 adapted to register with a hole in a lug 165 on the end of the piston rod. The spring 63 has its forward end bent into line with the axis of the piston rod and this bent end is adapted to extend through the hole of the lug 165 into the hole 67 in the piston when the piston is screwed into position, thus locking the piston against unscrewing. In order to disassemble the parts the spring 63 is pressed back until its forward end is withdrawn from the holes in the piston and in the lug 165 and the piston is then unscrewed and removed. The spring may then be slipped off the piston rod, and this being removed the abutment 62 may then be slipped off. These parts may be readily reassembled by first slipping the abutment into position, then slipping the spring onto the piston rod and finally screwing the piston into position and locking it by means of the bent end of the spring.

The cocking slide 33 is for the purpose of drawing back the operating slide to open the breech to permit the first cartridge to be inserted and fired. After it has been drawn back to draw back the operating slide it should be returned to its forward position and its handle turned down to bring its shank into engagement with a locking notch 36 which extends downward from the slot 32.

The spring 87 which presses the free end of the sear upward is carried by a pin 88 preferably having a milled head 91 on its outer end, the upper end of the spring fitting into a recess in the under side of the sear. The pin is provided with opposite laterally projecting lugs 90. The under side of the portion of the gun frame in which the bearing for the journal 85 of the sear is formed is cut away to form an open slot 14 through which the sear may be inserted into operative position. In the walls of this slot 14 are formed opposite recesses adapted to permit the lugs 90 to turn freely in them and having opposite locking notches to receive the lugs 90 and in which they are held by the tension of the spring 87.

In placing the sear in operative position its forward end 85 is inserted through the slot 14 into its bearing and the rear end of the sear pressed upward. The spring 87 with its pin 88 is then inserted with the lugs 90 in line with the slot 14 and pressed upward against the force of the spring until the lugs are opposite the recesses when the pin is given a quarter turn which brings the lugs in line with the notches into which they are forced by the spring, thus locking the pin and with it the sear against removal.

The triggers 81 and 82 are adapted to be readily inserted and removed without the use of tools. The slot 14 extends rearward and is of sufficient width to receive the triggers side by side and permit them to move freely on their pivots. The trigger 82 which, as above described, is adapted to momentarily depress the sear to fire a single shot, is first placed in position by inserting its finger end into the left-hand side of the trigger recess from the front, slipping the forward end of its spring 96 over its pin 126 and drawing the trigger rearward until the lug 95 on its upper side is in rear of the pivot pin 94 which is of a length corresponding to the thickness of the trigger and pressing the trigger bodily over to the left until it is against the side of the trigger recess. The spring 96 will then draw the trigger forward to embrace the pivot pin 94 between the lug 95 and the upper edge of the trigger. The trigger 81 may then be placed in position by inserting its finger end from the front into the trigger recess raising the trigger sufficiently to bring the lug 93 on its upper edge above the pivot pin 92. When the trigger 81 is in position the trigger 82 will be held against movement to the left to slip off its pivot 94. The triggers will, of course, be inserted in position before the sear is placed in position and the sear when in operating position locks the triggers against removal.

The detent pawl 136 is preferably constructed to be capable of being readily detached without tools. It is carried by a hollow rod 137 in which is located a coiled spring the rod 137 fitting in a socket 138 secured to the gun frame beneath the flat portion or table. The opening in the flat portion 26 of the gun frame through which the pawl 136 extends to engage the teeth 135 of the cartridge magazine is formed with a circular portion adapted to receive the rod 137 and with a radial slot 141 extending from this circular portion (Fig. 5) and a radial recess 41 on the under side of said flat portion 26. The upper end of rod 137 is provided with an outwardly extending lug 140 adapted to readily pass through the slot 141 and the middle portion of rod 137 is preferably roughened for convenience in handling. In order to place the pawl 137 in operating position one end of the spring is inserted in the hollow rod 137 and the rod and spring is pushed through the opening in the flat portion of the gun frame into the socket 138 and the lug 140 is brought in line with slot 141. The pawl and its rod 137 is then pressed down against the force of the spring until the head of the pawl is below the under surface of the flat portion of the gun frame when the rod is rotated to bring its lug 140 in line with the recess 41 into which it is forced by the spring.

The spring catches 154 for locking the cartridge magazine in position are each preferably carried in a socket on the outside of the cylinder 16 with its socket end normally projecting through an aperture in the side of the cylinder to engage the flange 155.

In assembling the operating parts of the gun, the triggers and detent pawl 136 will be first placed in position. The operating parts carried by the door 109 may then be conveniently assembled while the door is detached, and the door then placed in position and the pintle 115 inserted, the door being left open. The operating slide with the piston and piston rod, having been assembled, may then be placed in position by inserting the piston in the rear open end of the lower chamber of the gun frame and pushing it forward the operating slide being so placed that its guide rib 53 will enter the guide groove 44. As the operating slide with its connected parts is pushed forward it will be necessary to depress the sear to permit the guide rib to pass freely forward. Before the breech bolt reaches the rear end of the receiver the cocking slide should be inserted in its guideway with its handle swung upward. As the forward end of the breech bolt reaches the end of the receiver the handle of the cocking slide should be swung over to the left. As the breech bolt is pushed further forward its ribs 70 enter the grooves or guideways 8 and as the operating slide is pushed further forward it carries the breech bolt into the receiver and also carries forward with it the cocking slide. The cap 18 may then be screwed to closed position. A cartridge magazine previously loaded with cartridges may then be placed in position in the cylinder 16, and the drum 121 should be rotated by hand until a cartridge is brought against the abutment 161. The door 109 may now be closed bringing the end of arm 156 into engagement with cam shoulder 64 on the rearward extension 62' of the abutment 62 putting the spring 63 slightly under tension and locking the abutment against rearward movement. The closing of the door also brings the pawl 110 into position to engage the teeth 135 of the magazine. The gun is now ready for operation. When it is desired to fire, the handle of the cocking slide 33 is released from its notch 35, and the slide drawn back drawing with it the operating slide and its connecting parts, including the breech bolt, and, through the cam groove 58 and the bell crank lever, causing the magazine to be rotated to force a cartridge against the cam face 163 of the yielding abutment 161 and downward into the slot 5 of the receiver where it is engaged by the retaining wings 6. As the cocking slide is returned to its initial position the operating slide will follow it under the action of the spring 63 until the shoulder 60 is engaged by the sear. In this forward movement of the operating slide the breech bolt is pushed against the butt of the cartridge carrying it forward into the breech of the gun and the breech bolt is rotated by the action of the upper end of the arm 55 on the cam incline of its slot 73 to lock it against rearward movement. On now pressing the trigger 82 the sear is withdrawn from engagement with the shoulder and the slide 54 permitted to be moved forward by the spring 63 causing the firing pin 57 to strike the primer of the cartridge and fire it. On the firing taking place a portion of the gases of discharge pass into the forward end of the gas cylinder through the openings 27 and drive the piston forcibly to the rear and with it the operating slide 54 unlocking the breech bolt and withdrawing it, carrying with it the empty shell of the cartridge and bringing cam 168 of the ejector 75 against the cam 10 forcibly ejecting the empty shell which is guided to the discharge opening 38 by the inclined face 65. The rearward movement of the operating slide also causes the magazine to be rotated to feed another cartridge into position to be pushed into the breech. As the operating slide nears the end of its rearward movement its movement is checked and stopped by the resistance to the entrance of its disk 59 into the cap 18 and by the resistance of the spring 63, and it at once begins its forward movement, pushing the cartridge into the breech, locking the breech bolt and being stopped by the sear engaging the shoulder 60 ready to be released by pressing the trigger to again fire a shot.

If the trigger 81 is pressed and held when the gun is cocked the cartridge will be fired as before and the operating slide will be pushed rearward as before to unlock and open the breech, withdraw the empty shell and eject it and cause another cartridge to be fed into position, but as the operating slide moves forward, the sear being out of the way of the shoulders 60 and 61, the cartridge will be fired at once and these operations will be repeated as long as the trigger 81 is pressed and the supply of cartridges holds out. The cartridge magazine may be made to hold any desired number of cartridges, preferably 250, and the rapidity of fire when the trigger 81 is pressed and held will depend somewhat on the strength of the spring 63. A speed of fire of 240 per minute may be readily secured.

It will be noted that the feed of the cartridge to the receiver is positive and is not dependent on gravity and consequently the feed will take place with regularity and certainty whatever the elevation of depression of the gun.

In Fig. 13 the helix 143 of the auger of the cartridge magazine is shown as formed from strips of sheet metal having the inner edges held in grooves in the inner cylinder 145, instead of being solid as shown in Fig. 1.

The cylinder 24 of the water jacket may be connected to the heads 22 and 23 by screw-threads 49 as shown in Fig. 11.

Instead of having the drum 121 arranged to rotate as shown in Fig. 1, and having the shelf 143 formed on a central auger, this shelf may be arranged to extend inward from the drum as shown in Fig. 22 the drum being stationary, the vertical wings 122 in this construction being carried by the central member positively rotated by suitable driving mechanism and acting on the bullet ends of the cartridges.

The auger may if preferred be constructed as shown in Fig. 23 of sufficient diameter to receive the cartridges and instead of the vertical wings 122 the drum 121 may be provided with an arm 172 vertically movable in a guide-way 174 formed on the inner face of the drum, this arm extending inward into the space 142 and engaging the uppermost cartridge and as the drum rotates, pushing the whole mass of cartridges forward.

If preferred the movable abutment 62 may be dispensed with and a fixed abutment 160 substituted as shown in Figs. 12 and 22 or as shown in Fig. 23 the auger may be formed with a curved end 175 to guide the cartridges to the slot 5 of the receiver.

In Fig. 15 I have shown the vertical wings 122 formed by a continuous strip of sheet metal secured in any convenient manner to the inner face of the drum 121.

Instead of the arrangement of the bell crank lever swinging on an axis at right angles to the longitudinal axis of the gun it may be arranged to swing on an axis parallel with the axis of the gun as shown in Figs. 15 and 16. In this modified construction the upper end of the vertical arm 102' of the bell crank lever engages a horizontal sliding pawl 176 arranged to slide in a recess 177 formed in the gun frame and having its tooth 178 arranged to engage teeth 179 extending radially from the lower edge of the drum 121 being pressed against the drum by spring 180. This sliding pawl 176 has a cam slot 181 formed in its free end with which engages a pin 182 carried by a locking pawl 183 pivoted at 184 and having a tooth 185 which when the end carrying the pin 182 is forced toward the drum as the sliding pawl 176 completes its stroke enters between the teeth 179 to stop the rotation of the drum, the locking pawl also having an extension 186 at its end opposite that carrying the pin 182, adapted, when the end carrying the pin 182 swings away from the drum, to enter between the teeth 179 and prevent rearward rotation of the drum.

It is obvious that many other modifications and arrangement of parts may be made without departing from the spirit of the invention and that the term rotary cartridge magazine applies generally to the several modified forms of the cartridge magazine herein set forth.

Having thus described my invention, what I claim is:—

1. In a gun, the combination of breech mechanism, a reciprocating operating slide adapted to operate the breech mechanism and having a cam guide the length of which corresponds with the extent of movement of said slide, a rotary cartridge magazine, and means in continuous engagement with and actuated by said cam guide for rotating the cartridge magazine to thereby feed cartridges to the breech mechanism.

2. In a gun, the combination of breech mechanism, a reciprocating operating slide adapted to operate the breech mechanism and having a cam guide the length of which corresponds with the extent of movement of said slide, a rotary cartridge magazine, a feed pawl for rotating the cartridge magazine to thereby feed cartridges to the breech mechanism, and means for actuating said feed pawl, said means having a projection in continuous engagement with said cam guide.

3. In a gun, the combination of breech mechanism, a rotary cartridge magazine, a reciprocating operating slide adapted to operate the breech mechanism and having a cam guide the length of which corresponds with the extent of movement of said slide, a feed pawl for rotating the cartridge magazine to thereby feed cartridges to the breech mechanism, means for actuating said feed pawl, said means having a projection in continuous engagement with said cam guide, and a stopping pawl controlled by said cam guide to stop the rotation of the cartridge magazine.

4. In a gun, the combination of breech mechanism, a reciprocating discharge-actuated operating slide adapted to operate the breech mechanism and having a cam guide the length of which corresponds with the extent of movement of said slide, a rotary cartridge magazine, and means in continuous engagement with and actuated by the cam guide for rotating the cartridge magazine to thereby feed cartridges to the breech mechanism.

5. In a gun, the combination of breech mechanism, a reciprocating discharge-actuated operating slide adapted to operate the breech mechanism and having a cam guide the length of which corresponds with the extent of movement of said slide, a rotary cartridge magazine, a feed pawl for rotating the cartridge magazine to thereby feed cartridges to the breech mechanism, and means for actuating said feed pawl, said means having a projection in continuous engagement with said cam guide.

6. In a gun, the combination of breech mechanism, a reciprocating discharge-actuated operating slide adapted to operate the breech mechanism and having a cam guide the length of which corresponds with the extent of movement of the slide, a rotary cartridge magazine, a feed pawl for rotating the cartridge magazine to thereby feed cartridges to the breech magazine, means for actuating said feed pawl, said means having a projection in continuous engagement with said cam guide, and a stopping pawl controlled by the cam guide to stop the rotation of the cartridge magazine.

7. In a gun, the combination of breech mechanism, an operating slide adapted to operate the breech mechanism and having a cam guide, a rotary cartridge magazine, and means actuated by the cam guide for rotating the cartridge magazine to feed a cartridge to the breech mechanism, the means for rotating the cartridge magazine being carried by a hinged door so arranged that when the door is open said means will be out of engagement with the cartridge magazine.

8. In a gun, the combination of breech mechanism, an operating slide adapted to operate the breech mechanism and having a cam guide, a rotary cartridge magazine, and a feed pawl actuated by the cam guide for rotating the cartridge magazine to feed the cartridges to the breech mechanism, the feed pawl being carried by a hinged door so arranged that when the door is open said feed pawl will be out of engagement with the cartridge magazine.

9. In a gun, the combination of breech mechanism, an operating slide adapted to operate the breech mechanism and having a cam guide, a rotary cartridge magazine, and a feed pawl actuated by the cam guide for rotating the cartridge magazine to feed the cartridges to the breech mechanism, and a stopping pawl controlled by the cam guide to stop the rotation of the cartridge magazine, the feed pawl and stopping pawl being carried on a hinged door so arranged that when the door is open the pawls will be out of engagement with the cartridge magazine.

10. In a gun, the combination of breech mechanism, a reciprocating operating slide adapted to operate the breech mechanism and having a cam guide the length of which corresponds with the extent of movement of said slide, a rotary cartridge magazine, a feed pawl for rotating the cartridge magazine to thereby feed cartridges to the breech mechanism, means for actuating said feed pawl, said means having a projection in continuous engagement with said cam guide, and a detent pawl engaging the cartridge magazine to prevent backward movement.

11. In a gun, the combination of breech mechanism, a reciprocating operating slide adapted to operate the breech mechanism and having a cam guide the length of which corresponds with the extent of movement of said slide, a rotary cartridge magazine, a feed pawl for rotating the cartridge magazine to thereby feed cartridges to the breech mechanism, means for actuating said feed pawl, said means having a projection in continuous engagement with said cam guide, a stopping pawl controlled by the cam guide to stop the forward rotation of the cartridge magazine, and a detent pawl engaging the cartridge magazine to prevent backward movement thereof.

12. In a gun, the combination of breech mechanism, a rotary cartridge magazine, a reciprocating operating slide adapted to operate the breech mechanism and having a cam guide the length of which corresponds with the extent of movement of said slide, a feed pawl for rotating the cartridge magazine to thereby feed cartridges to the breech mechanism, means for actuating said feed pawl, said means having a projection in continuous engagement with said cam guide, a movable abutment located in the path of movement of the cartridges, a spring for forcing said abutment in a direction opposite to that in which the cartridges move and the force of which is overcome by force transmitted through each successive cartridge after it has come into contact with said abutment and during the final forward movement of the cartridge, said abutment being operated entirely by engagement of the successive cartridges therewith, and not otherwise, and being entirely independent of any moving part of the mechanism of the gun, and a detent pawl engaging the cartridge magazine to prevent rearward movement thereof.

13. In a gun, the combination of breech mechanism, a reciprocating operating slide adapted to operate the breech mechanism and having a cam guide the length of which corresponds to the extent of movement of said slide, a rotary cartridge magazine, a feed pawl for rotating the cartridge magazine to thereby feed cartridges to the breech mechanism, means for actuating said feed pawl, said means having a projection in continuous engagement with said cam guide, a movable abutment located in the path of movement of the cartridges, a spring for forcing said abutment in a direction opposite to that in which the cartridges move and the force of which is overcome by force transmitted through each successive cartridge after it has come into contact with said abutment and during the final forward movement of the cartridge, said abutment being operated entirely by engagement of the successive cartridges therewith, and not otherwise, and being entirely independent of any moving part of the mechanism of the gun, and a stopping pawl controlled by the cam guide to stop a further movement of the cartridge magazine on the completion of its forward movement.

14. In a gun, the combination of breech mechanism, a reciprocating operating slide adapted to operate the breech mechanism and having a cam guide the length of which corresponds with the extent of movement of said slide, a rotary cartridge magazine and feed pawl for rotating the cartridge magazine to thereby feed cartridges to the breech mechanism, means for actuating said feed pawl said means having a projection in continuous engagement with said cam guide, a movable abutment located in the path of movement of the cartridges, a spring for forcing said abutment in a direction opposite to that in which the cartridges move and the force of which is overcome by force transmitted through each successive cartridge after it has come into contact with said abutment and during the final forward movement of the cartridge, said abutment being operated entirely by engagement of the successive cartridges therewith, and not otherwise, and being entirely independent of any moving part of the mechanism of the gun, a stopping pawl controlled by the cam guide to stop a further forward movement of the cartridge magazine on the completion of its forward movement, and a detent pawl engaging the cartridge magazine to prevent rearward movement thereof.

15. In a gun, a cartridge feed mechanism comprising a stationary member having a helical way adapted to guide the cartridges and a rotary member concentric with the stationary member provided with means for engaging the cartridges to move them in a helical path concentric with the stationary member, cam operated means for rotating the rotary member, and a yielding abutment independent of the rotating means arranged in the path of movement of the cartridges.

16. In a gun, a cartridge feed mechanism comprising a stationary member having a helical way adapted to guide the cartridges and a rotary member concentric with the stationary member provided with means for engaging the cartridges to move them in a helical path concentric with the stationary member, cam operated means for rotating the rotary member, a yielding abutment independent of the rotating means arranged in the path of movement of the cartridges, and a detent pawl engaging the rotary member to prevent backward movement.

17. In a gun, a cartridge feed mechanism comprising a stationary member having a helical way adapted to guide the cartridges and a rotary member concentric with the stationary member provided with means for engaging the cartridges to move them in a helical path concentric with the stationary member, a feed pawl for rotating the rotary member, a cam for operating the feed pawl, a yielding abutment independent of the rotating means arranged in the path of movement of the cartridges, and a stop pawl controlled by the cam for stopping the movement of the rotary member.

18. In a gun, a cartridge feed mechanism comprising a stationary member having a helical way adapted to guide the cartridges and a rotary member concentric with the stationary member provided with means for engaging the cartridges to move them in a helical path concentric with the stationary member, a feed pawl for rotating the rotary member, a cam for operating the feed pawl, a yielding abutment independent of the rotating means arranged in the path of movement of the cartridges, a stopping pawl controlled by the cam to stop the movement of the rotary member, and a detent pawl engaging the rotary member to prevent backward movement.

19. In a gun, a cartridge feed mechanism comprising a stationary auger adapted to engage the bullet ends of the cartridges, a rotary drum provided with means to engage the shell ends of the cartridges, cam operated means for rotating the drum, and a yielding abutment independent of the drum rotating means, arranged in the path of the cartridge to be fed to the gun.

20. In a gun, a cartridge feed mechanism comprising a stationary auger adapted to engage the bullet ends of the cartridges, a rotary drum provided with means to engage the shell ends of the cartridges, cam operated means for rotating the drum, a yielding abutment independent of the drum rotating means, arranged in the path of the cartridge to be fed to the gun, and a detent pawl engaging the drum to prevent backward movement.

21. In a gun, a cartridge feed mechanism comprising a stationary auger adapted to engage the bullet ends of the cartridges, a rotary drum provided with means to engage the shell ends of the cartridges, a feed pawl for rotating the drum, a cam for operating the feed pawl, a yielding abutment independent of the feed pawl, arranged in the path of movement of the cartridge to be fed to the gun, and a stop pawl controlled by the cam for stopping the rotation of the drum.

22. In a gun, a cartridge feed mechanism comprising a stationary auger adapted to engage the bullet ends of the cartridges, a rotary drum provided with means to engage the shell ends of the cartridges, a feed pawl for rotating the drum, a cam for operating the feed pawl, a yielding abutment independent of the feed pawl, arranged in the path of movement of the cartridge to be fed to the gun, a stop pawl controlled by the cam for stopping the rotation of the drum, and a detent pawl engaging the drum to prevent backward movement.

23. In a discharge actuated gun, the combination of breech mechanism and an operating slide for operating the breech mechanism, a piston rod extending forward from the operating slide provided with a piston and with an abutment freely movable on the piston rod, a spring between the piston and abutment, and a hinged door provided with an arm for holding the abutment against rearward movement.

24. In a discharge actuated gun, the combination of breech mechanism and an operating slide for operating the breech mechanism, a cartridge magazine and means actuated by the operating slide for operating the cartridge magazine to feed a cartridge to the breech mechanism, a piston rod extending forward from the operating slide provided with a piston and with an abutment freely movable on the piston rod, a spring between the piston and abutment, and a hinged door provided with an arm for holding the abutment against rearward movement.

25. In a discharge actuated gun, the combination of breech mechanism and an operating slide for operating the breech mechanism, a cartridge magazine and means actuated by the operating slide for operating the cartridge magazine to feed a cartridge to the breech mechanism, a piston rod extending forward from the operating slide provided with a piston and with an abutment freely movable on the piston rod, a spring between the piston and abutment, and a hinged door provided with an arm for holding the abutment against rearward movement, the hinged door also carrying the means for actuating the cartridge magazine.

26. In a discharge actuated gun, the combination of breech mechanism and an operating slide for operating the breech mechanism, the gun frame provided with a chamber in which the operating slide reciprocates and a gas chamber in line therewith, a piston rod extending forward from the operating slide into the gas chamber provided with a piston and with an abutment freely movable on the piston rod, a spring between the piston and abutment and a hinged door provided with an arm for holding the abutment against rearward movement.

27. In a discharge actuated gun, the combination of breech mechanism and an operating slide for operating the breech mechanism, the gun frame provided with a chamber in which the operating slide reciprocates and a gas chamber in line therewith, a piston rod extending forward from the operating slide into the gas chamber provided with a piston and with an abutment freely movable on the piston rod, a spring between the piston and abutment, a hinged door provided with an arm for holding the abutment against rearward movement, and a remov able cap for closing the rear end of the chamber in which the operating slide reciprocates, the arrangement being such that when the hinged door is opened and the cap removed the operating slide with its piston rod and piston may be withdrawn together from the gun frame.

28. In a discharge actuated gun, the combination of breech mechanism and an operating slide for operating the breech mechanism having a guide rib thereon, the gun frame provided with a chamber in which the operating slide reciprocates having a guide groove formed therein to receive the guide rib of the operating slide and having a removable cap at its rear end, and a gas chamber extending forward in line with the chamber in which the operating slide reciprocates, a piston rod extending forward from the operating slide into the gas chamber, and provided with a piston and an abutment freely movable on the piston rod, a spring between the piston and the abutment, and a hinged door provided with an arm for holding the abutment against rearward movement, the construction being such that when the hinged door is opened and the cap is removed the operating slide and its piston rod and piston may be together withdrawn from the gun frame.

29. In a discharge operated gun, the combination of breech mechanism and an operating slide for operating the breech mechanism, having a disk on its rear end, the gun frame provided with a chamber in which the operating slide reciprocates having a removable cap at its rear end, said cap having a chamber formed therein adapted to receive said disk and form therewith a dash pot, and a piston and piston rod for reciprocating the operating slide.

30. In a discharge actuated gun, the combination of breech mechanism and an operating slide for operating the breech mechanism, a piston rod extending forward from the operating slide provided with a piston and an abutment adapted to move freely on the piston rod and having a cam connected therewith, a spring between the piston and abutment, and a hinged door provided with an arm adapted to engage the cam of the abutment to force the abutment forward to put the spring under tension and hold the abutment against rearward movement.

31. In a discharge actuated gun, the combination of a gun barrel, a receiver in which the gun barrel is secured having a slot therein for inserting the cartridge, and having locking lugs on its interior, a breech bolt having locking lugs adapted to engage the locking lugs of the receiver, and having a cam slot formed therein, an operating slide having a cam guide and having an arm extending into the slot of the breech bolt, the receiver being slotted to receive the arm, a cartridge magazine, means operated by the cam guide to operate the cartridge magazine to feed a cartridge to the slot of the receiver and means to reciprocate the slide to lock and unlock and reciprocate the breech bolt and actuate the cartridge magazine operating means.

32. In a discharge actuated gun, the combination of a gun-barrel, a receiver in which the gun-barrel is secured open at its rear end and provided with a slot to receive the cartridge and with a slot in its under side and having on its interior longitudinal ribs provided with locking lugs, the spaces between said ribs forming guide-ways, a breech-bolt having a cam slot formed therein and having longitudinal ribs bearing locking lugs for engagement with said locking lugs of the receiver, said ribs on the breech-bolt being fitted to slide in said guide-ways of the receiver, an operating slide having an arm extending through the slot in the under side of the receiver and into the cam-slot of the breech-bolt, a piston-rod with its piston extending forward from the operating slide, the gun frame having an upper chamber open at its rear end for the receiver and a lower chamber also open at its rear end in which the said slide reciprocates, and a removable cap for the rear end of the lower chamber having an extension adapted to close the rear end of the receiver for the purpose set forth.

33. In a gun, a breech bolt carrying shell extractors and an ejector, a discharge actuated operating slide adapted to operate the breech bolt and provided with a deflector for the ejected shell, and with a piston rod and a spring carried by the piston rod.

34. In a gun, a breech bolt carrying shell extractors and an ejector, a discharge actuated operating slide adapted to operate the breech bolt, the gun frame having a chamber in which the operating slide reciprocates provided with a discharge opening for the shells, the operating slide being provided with a deflector adapted to direct the ejected shells toward the discharge opening.

35. In a gun, the combination of breech mechanism, a discharge actuated operating slide carrying a firing pin and adapted to operate the breech mechanism and provided with a sear notch, a spring actuating the operating slide in one direction, a sear adapted to engage the sear notch of the operating slide, a trigger engaging the sear, an auxiliary trigger also engaging the sear provided with a cam and means carried by the gun frame to engage the cam.

36. In a gun, the combination of breech mechanism, a discharge actuated operating slide carrying a firing pin and adapted to operate the breech mechanism and provided with a sear notch, a spring actuating the operating slide in one direction, a sear adapted to engage the sear notch of the operating slide, a trigger engaging the sear, an auxiliary trigger also engaging the sear provided with a cam, means carried by the gun frame to engage the cam and a spring to draw the auxiliary trigger forward.

37. In a gun, the combination of a gun frame, breech mechanism, a discharge actuated operating slide carrying a firing pin and adapted to operate the breech mechanism and provided with a sear notch, a spring actuating the operating slide in one direction, a sear adapted to engage the sear notch of the operating slide, a removable trigger for operating the sear, said gun frame being provided with a recess to receive both the trigger and the sear and having a bearing at its forward end for the forward end of the sear, the sear being so arranged that when in operating position its rear end will extend to a point adjacent the forward end of the trigger to thereby hold the trigger against removal.

38. In a gun, the combination of a gun frame, breech mechanism, a discharge actuated operating slide carrying a firing pin and adapted to operate the breech mechanism and provided with a sear notch, a spring actuating the operating slide in one direction, a sear adapted to engage the sear notch of the operating slide, a removable trigger for operating the sear, said gun frame being provided with a recess to receive both the trigger and the sear and having a bearing at its forward end for the forward end of the sear, the sear being so arranged that when in operating position its rear end wil extend to a point adjacent the forward end of the trigger to thereby hold the trigger against removal, and means for detachably locking the sear in operating position.

39. In a gun, the combination of a gun frame, breech mechanism, a discharge actuated operating slide carrying a firing pin and adapted to operate the breech mechanism and provided with a sear notch, a spring actuating the operating slide in one direction, a sear adapted to engage the sear notch of the operating slide, a removable trigger for operating the sear, a removable auxiliary trigger also for operating the sear, said gun frame being provided with a recess adapted to receive the triggers and provided also with pivot pins for the triggers the pivot pin for one of the triggers being of a length corresponding to the thickness of that trigger and the recess being of a width corresponding to the thickness of the two triggers so as to receive them side by side, said recess being also adapted to receive the sear and having a bearing at its forward end for the forward end of the sear, the sear being so arranged that when in operating position its rear end will extend to a point adjacent the forward end of the triggers to thereby retain the triggers against removal.

40. In a gun, the combination of breech mechanism, and an operating slide for operating the breech mechanism, a cartridge feed device and means operated by the operating slide to actuate the cartridge feed device carried by a door hinged to the gun frame, and a removable pintle for the hinge connecting the door to the gun frame.

41. In a gun, the combination of breech mechanism and an operating slide for operating the breech mechanism, a cartridge feed device and means operated by the operating slide to actuate the cartridge feed device carried by a door hinged to the gun frame, and a removable pintle for the hinge connecting the door to the gun frame having a groove formed therein and a removable pin engaging the groove to lock the pintle against removal.

42. In a gun, the combination of breech mechanism and an operating slide for operating the breech mechanism, a cartridge feed device and means operated by the operating slide to actuate the cartridge feed device carried by a door hinged to the gun frame, and a removable pintle for the hinge connecting the door to the gun frame having a groove formed therein and a removable pin engaging the groove to lock the pintle against removal, the door being provided with a shoulder engaging the pin to hold it against removal when the door is closed.

43. In a gun, the combination of breech mechanism and an operating slide adapted to operate the breech mechanism provided with a cam groove, a cartridge feed device and means operated by the operating slide for actuating the cartridge feed device comprising a bell crank lever having on one arm a pin adapted to engage the cam groove of the operating slide and having on its other end a pawl adapted to engage the cartridge feed device.

44. In a gun, the combination of breech mechanism and an operating slide adapted to operate the breech mechanism provided with a cam groove, a cartridge feed device, means operated by the operating slide for actuating the cartridge feed device comprising a bell crank lever having on one arm a pin adapted to engage the cam groove of the operating slide and having on its other end a pawl adapted to engage the cartridge feed device and a stopping pawl controlled by the bell crank lever to engage the cartridge feed device.

45. In a gun, the combination of breech mechanism and an operating slide adapted to operate the breech mechanism provided with a cam groove, a cartridge feed device and means operated by the operating slide for actuating the cartridge feed device comprising a bell crank lever having on one arm a pin adapted to engage the cam groove of the operating slide and having on its other end a pawl adapted to engage the cartridge feed device the bell crank lever being mounted to rock on a short shaft, and a spring actuated locking disk carried by the shaft for holding the bell crank lever in position.

46. In a gun, the combination of breech mechanism and an operating slide adapted to operate the breech mechanism provided with a cam groove, a cartridge feed device and means operated by the operating slide for actuating the cartridge feed device comprising a bell crank lever having on one arm a pin adapted to engage the cam groove of the operating slide and having on its other end a pawl adapted to engage the cartridge feed device the bell crank lever being mounted to rock on a short shaft, and a spring actuated locking disk carried by the shaft for holding the bell crank lever in position having a radially projecting locking lug, the bell crank lever being provided with a groove to receive the lug and a locking recess into which the locking lug extends when the bell crank lever is in operating position.

47. In a gun, the combination of breech mechanism and an operating slide adapted to operate the breech mechanism provided with a cam groove, a cartridge feed device and means operated by the operating slide for actuating the cartridge feed device comprising a bell crank lever having one arm adapted to engage the cam groove of the operating slide and having its other end provided with means for engaging the cartridge feed device, and a stopping pawl actuated by the bell crank lever to engage the cartridge feed device, said stopping pawl being carried on a pivot having radial lugs, the pawl having its bearing for the pivot provided with radial slots to receive the lugs of the pivot when rotated to bring the slots in line with the lugs.

48. In a gun, the combination of breech mechanism and an operating slide adapted to operate the breech mechanism provided with a cam groove, a cartridge feed device and means operated by the operating slide for actuating the cartridge feed device comprising a bell crank lever having one arm adapted to engage the cam groove of the operating slide and having its other end provided with means for engaging the cartridge feed device, and a stopping pawl actuated by the bell crank lever to engage the cartridge feed device, said stopping pawl being carried on a pivot having radial lugs, the pawl having its bearing for the pivot provided with radial slots to receive the lugs of the pivot when rotated to bring the slots in line with the lugs, and a spring for the stopping pawl arranged to hold the pawl with its slots out of line with the lugs of the pivot.

49. In a gun, a reciprocating breech bolt, a magazine above the breech having a horizontally rotating cartridge holding drum from which the cartridges are delivered downward and directly into position to be advanced longitudinally into the barrel, and means actuated by the gases of discharge for reciprocating the breech bolt and rotating said drum to deliver the cartridges.

50. In a gun, a reciprocating breech bolt, a magazine above the breech having a horizontally rotating cartridge holding drum from which the cartridges are delivered downwardly, means actuated by the gases of discharge for reciprocating the breech bolt and rotating said drum to deliver the cartridges and a stationary cartridge support to which the cartridge is delivered from the drum in position to be advanced longitudinally from the support into the breech.

51. In a gun, a reciprocating breech bolt, a magazine above the breech having a horizontally rotating cartridge holding drum from which the cartridges are delivered downward, means actuated by the gases of discharge for reciprocating the breech bolt and rotating said drum to deliver the cartridges, and side plates arranged to receive in position to be advanced from the plates longitudinally into the breech.

SAMUEL N. McCLEAN.

Witnesses:
C. O. MALPAS,
G. BURGNER.

Corrections in Letters Patent No. 1,042,363.

It is hereby certified that in Letters Patent No. 1,042,363, granted October 22, 1912, upon the application of Samuel N. McClean, of Cleveland, Ohio, for an improvement in "Breech-Loading and Discharge-Actuated Firearms," errors appear in the printed specification requiring correction as follows: Page 10, line 65, for the word "magazine" read *mechanism;* page 15, line 99, after the word "receive" insert the article and words *a cartridge from the drum and support it;* and that the said Letters Patent should be read with these corrections therein that the same may conform to the record of the case in the Patent Office.

Signed and sealed this 21st day of January, A. D., 1913.

[SEAL.]

C. C. BILLINGS,
*Acting Commissioner of Patents.*